Figure 1:
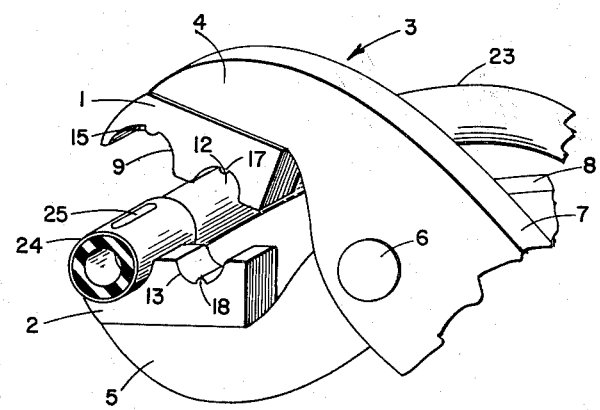

March 30, 1965     R. H. ELFSTEN     3,175,281
METHOD AND TOOL FOR REPAIRING A HOSE
Filed April 26, 1963

*INVENTOR.*
ROBERT H. ELFSTEN
BY
ATTORNEY

United States Patent Office 3,175,281
Patented Mar. 30, 1965

3,175,281
METHOD AND TOOL FOR REPAIRING A HOSE
Robert H. Elfsten, Los Angeles, Calif., assignor to Bestools, Inc., Lynwood, Calif., a corporation of California
Filed Apr. 26, 1963, Ser. No. 276,038
3 Claims. (Cl. 29—401)

This application is a continuation in part of my copending application for Crimping Tool, Serial No. 96,802, filed March 20, 1961, now abandoned.

This invention provides a tool especially adapted for use in the method of repairing a hose or the like by means of a metal ferrule.

One area in which the repair of hose is particularly important is in regard to the hoses of welding devices. These are relatively thick-walled flexible rubber composition hoses carrying the welding gas from the tanks to the welder's torch. The hoses generally are rather long to permit the welder to work some distance from the heavy, bulky gas supply tanks. As a result, the hoses are vulnerable to damage and breaks in the hoses occur with some frequency. Unless field repairs are made, an expensive delay is encountered from the inoperative welding system resulting from an unusable hose.

In the past it has been proposed to make repairs with a ferrule around the separated ends of the hose, which is to be crimped inwardly by suitable jaws to grip the hose. Frequently two jaws may be provided, each of which includes a semicylindrical aperture and which together provide an opening slightly smaller in diameter than that of the ferrule. These jaws are forced together around the exterior of the ferrule in order to crimp the ferrule around the hose to effect repair. In order to permit the material of the ferrule to flow and to prevent the wall of the ferrule from collapsing asymmetrically, relief notches have been included in the openings defined in the jaws. These notches allow a small portion of the material to move outwardly as the ferrule wall is urged inwardly against the hose. The resulting arrangement has made is possible to effect some sort of field repairs of welding hose or the like. On the other hand, the connections provided in this manner have not always been satisfactory, and in many instances the repair is of insufficient strength or will allow leakage at the joint.

According to the provisions of this invention, a crimping tool is provided that can produce an improved connection between hose segments to be joined. This centers around the inclusion of jaws that, instead of having relief notches, are equipped with axially extending projections for pressing localized areas of the material of the ferrule inwardly.

Therefore, it is an object of this invention to provide an arrangement for connecting hose segments.

Another object of this invention is to provide a means of securing a metal tube around axially engaged hose segments for effecting a joint.

A further object of this invention is to provide a crimping tool provided with opposed jaw elements defining a cylindrical opening having spaced inward projections therein.

A still further object of this invention is to provide a means of effecting field repairs in separated hose elements so as to provide a leak-proof joint of superior strength.

Figure 2:
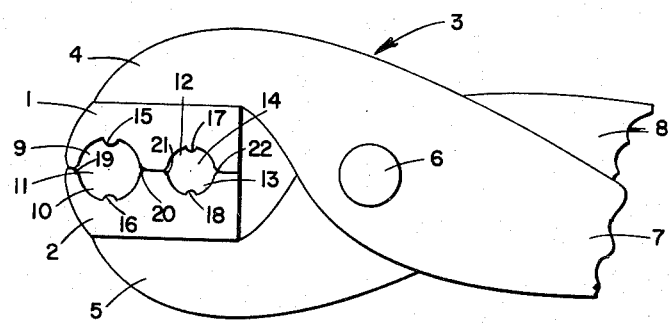
Figures 3, 4:
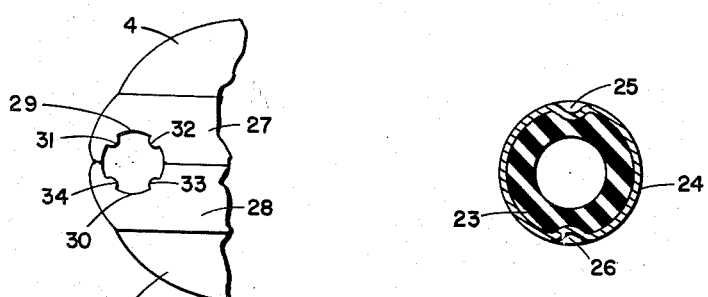

These and other objects will become apparent from the following detailed description taken in connection with the accompanying drawing in which:

FIG. 1 is a perspective view of the arrangement of this invention in use for effecting a connection in a hose, FIG. 2 is a side elevational view of the tool of FIG. 1 with the jaws in the closed position and the hose removed, FIG. 3 is a transverse sectional view of a joint accomplished through the use of the tool of this invention, and FIG. 4 is a fragmentary side elevational view of a modified form of the crimping tool.

With reference to FIGS. 1 and 2 of the drawing, the crimping tool of this invention includes opposed dies 1 and 2 which may be separated, as indicated in FIG. 1, or brought together, as shown in FIG. 2. While a variety of arrangements may be devised for causing such relative movement of the dies 1 and 2, they conveniently are associated with pliers 3, forming inserts for the plier jaws 4 and 5. In the embodiment illustrated the plier jaws are of generally conventional design, pivoted about pin 6 and extending into handles 7 and 8. For such pliers, the handles should be relatively long so that considerable force can be exerted on the inserts 1 and 2. In many instances it is preferred to select lever jaw type pliers which give the user a mechanical advantage that facilitates the application of an adequate force urging the jaw inserts 1 and 2 together.

In the arrangement of FIGS. 1 and 2 the dies 1 and 2 have semicylindrical transversely extending recesses 9 and 10 near the outer edges thereof which, when the jaws are closed, define a substantially cylindrical opening 11. In order to provide versatility for the tool, allowing it to be used with hoses of different diameters, the dies likewise may include semicylindrical recesses 12 and 13 that together define an adjacent, slightly smaller cylindrical opening 14.

Extending inwardly from the upper portion of the recess 9 is a protuberance 15. This may be in the form of a relatively small semicylindrical element running the width of the die. Diametrically opposite the projection 15 is a similarly shaped projection 16 extending in from the surface of recess 10. The smaller recesses 12 and 13 also include diametrically opposed transverse inward projections 17 and 18.

A slight relief, in the form of small notches 19 and 20, may be included in the opening 11 where the die elements 1 and 2 mate. The smaller opening 14, being similar in construction, also has relief notches 21 and 22. A cutter may be provided at the outer edge of the dies by making the edge thin where the surfaces meet beyond the notch 19, as shown.

In the event that a break occurs in a length of hose, such as the hose 23 of FIG. 1, the two separated ends of the hose are fitted within a substantially complementary ferrule 24 which is in the form of a relatively short metal tubular member. After this, the dies 1 and 2 are brought together so that the recesses 9 and 10 cause the ferrule to be crimped about the exterior of the hose for connecting the two segments together. As this occurs, the inward projections 15 and 16 cause longitudinal notches 25 and 26 to be formed in the ferrule where the ferrule material is driven inwardly locally. As a result of the formation of the notches 25 and 26 by the inward projections 15 and 16, a vastly superior joint is obtained. It will be found that the sections of the tubes are held together with much greater strength and that the problem of leakage at the joint is obviated. Without the indentations resulting from the protuberances in the jaw openings, the connection is nowhere near as effective.

Of course the smaller opening 14 permits a single set of die inserts 1 and 2 to serve as a crimping tool for more than one size of hose. For use with welding hose, therefore, these openings may be dimensioned to fit the two sizes of hose commonly encountered.

In the modification of FIG. 4 die inserts 27 and 28 include transverse recesses 29 and 30 that are generally similar to the recesses 9 and 10. However, instead of the single inward protuberance in each recess, as in the previously described embodiment, two are provided. Thus, the recess 29 includes transversely extending semicylindrical members 31 and 32 extending above the arcuate surface of the recess 29. Diametrically opposed are similar semicylindrical projections 33 and 34. In this arrangement the protuberances 31, 32, 33 and 34 may be made slightly smaller than the projections 15 and 16. In addition, these four projecting elements may be located in the recess at an angle of 45° from the parting surface between the two jaw inserts, rather than being positioned at right angles relative thereto as in the previously described arrangement.

Also, as illustrated in FIG. 4 the relief notches 19 and 20 are omitted. The design of FIG. 4 crimps the ferrule as satisfactorily and easily as in the previously described embodiment. Four longitudinal notches are provided in the ferrule by the projections 31, 32, 33 and 34. Again this results in a particularly strong and leakproof joint.

It can be seen, therefore, that I have provided a crimping tool that, by following the opposite approach from prior designs through the inclusion of inward protuberances in the die recesses, results in an improved connection for hose elements or the like. The invention is of course not limited to the repair of welding hose, but may be used also for similar items or wherever it is desired to crimp one tubular element on the exterior of another.

The foregoing detailed description is to be clearly understood as given by way of illustration and example only, the spirit and scope of this invention being limited solely by the appended claims.

I claim:

1. A crimping tool for securing a ferrule on a hose comprising
  a pair of die members,
  a pair of actuating jaws for said die members,
    said jaws mounting said die members in opposed relationship,
      whereby said die members are movable toward and away from each other,
    said die members including adjacent surfaces that are capable of being brought into an abutting relationship when said die members are moved toward each other,
    each of said die members including a substantially semicylindrical transversely extending recess therein,
      said recesses cooperating to define a substantially cylindrical aperture when said adjacent surfaces are in said abutting relationship, said aperture being slightly smaller than the exterior dimension of a ferrule to be secured, said die members having a width less than the length of said ferrule so that said ferrule can project beyond either side thereof when said ferrule is received in said aperture,
  each of said recesses having a protuberance in the wall thereof projecting inwardly toward the axis of said recess,
    each of said protuberances being relatively narrow in width and extending the full length of the recess with which it is associated substantially parallel to the axis thereof said protuberances being in diametrically opposed relationship,
  said die members at said adjacent surfaces being contoured to define a pair of opposed notches extending radially outward from said substantially cylindrical apertures when said adjacent surfaces are in said abutting relationship, said notches being longitudinally substantially parallel to the axis of said recess and extending the full width of said recess.

2. A device as recited in claim 1 in which there is a duality of said protuberances,
  said protuberances being angularly positioned substantially 90° from said adjacent surfaces of said die members.

3. The method of repairing a fluid-conducting hose comprising the steps of
  fitting over an area to be repaired a cylindrical ferrule having an interior surface substantially complementary to the exterior surface of said hose, providing a duality of jaw members each with a semicylindrical recess extending the width thereof
    and a shorter length than the length of said ferrule, such that said jaws are adapted to come together to define a substantially cylindrical opening slightly smaller than the exterior dimensions of said ferrule,
  providing in said jaws recesses that when said jaws are together define diametrically opposed relief notches extending outwardly from said cylindrical opening,
  providing in each of said recesses a substantially semicylindrical axially extending protuberance extending the width of the jaw and located substantially 90 degrees from said notches,
  then associating said ferrule with said jaws with said jaws remote from each other in a manner such that said ferrule projects axially beyond said jaws on either side thereof,
  and then bringing said jaws together so as to crimp said ferrule on said hose and indent said ferrule simultaneously by said protuberances in diametrically opposed positions.

References Cited in the file of this patent

UNITED STATES PATENTS

| | | |
|---|---|---|
| 2,314,236 | Mott | Mar. 16, 1943 |
| 2,601,462 | Streader | June 24, 1952 |
| 2,819,634 | Hansen | Jan. 14, 1958 |
| 2,999,703 | Myers | Sept. 12, 1961 |